United States Patent [19]

Wang et al.

[11] Patent Number: 5,081,320

[45] Date of Patent: Jan. 14, 1992

[54] HALIDE/ALKOXY-CONTAINING MAGNESIUM COMPOUNDS

[75] Inventors: Bor-Ping E. Wang, Ossining; Elliot I. Band, North Tarrytown; Richard J. Amata, Peekskill, all of N.Y.

[73] Assignee: Akzo NV, Arnhem, Netherlands

[21] Appl. No.: 497,294

[22] Filed: Mar. 22, 1990

[51] Int. Cl.$^5$ .................. C07C 29/70; C07C 31/125
[52] U.S. Cl. ............................................. 568/851
[58] Field of Search ......................................... 568/851

[56] References Cited

U.S. PATENT DOCUMENTS

| | | | |
|---|---|---|---|
| 4,370,257 | 1/1983 | Imai et al. | 568/851 |
| 4,609,754 | 9/1986 | Hall et al. | 568/851 |
| 4,792,640 | 12/1988 | Mehta | 568/851 |
| 4,820,879 | 4/1989 | Mehta | 568/851 |
| 4,952,737 | 8/1990 | Inkrott | 568/851 |

FOREIGN PATENT DOCUMENTS 36510 2/1985 Japan.

OTHER PUBLICATIONS

Cason "Essential Principles of Organic Chemistry" (1956) pp. 25-30.

*Primary Examiner*—J. E. Evans
*Attorney, Agent, or Firm*—Richard P. Fennelly; Louis A. Morris

[57] ABSTRACT

Halide alkoxy-containing compounds of the formula ROMgX, where X is halide (e.g., chloride) and R is derived from a $C_4$-$C_{15}$ normal secondary alcohol (e.g., 2-octanol) are hydrocarbon soluble.

12 Claims, No Drawings

HALIDE/ALKOXY-CONTAINING MAGNESIUM COMPOUNDS

BACKGROUND OF THE INVENTION

Japanese Patent Publication No. 36510/1985, in Example 3, describes production of a halide/alkoxy-containing magnesium compound using 1-ethylheptoxymagnesium chloride and 1-ethylheptanol without indicating whether such a halide alkoxy-containing magnesium compound, which contains a ligand derived from a secondary alcohol bearing an alkyl branch on the carbon atom alpha to the hydroxyl group, either is or is not hydrocarbon soluble.

U.S. Pat. Nos. 4,792,640 and 4,820,879 to V. C. Mehta both describe hydrocarbyloxy magnesium halides of the general formula ROMgX, where X is halide, such as chloride, and where R can be alkyl, cycloalkyl, aryl, or aralkyl. Both the more recent '640 and '879 patents indicate that either beta-alkyl substituted acyclic secondary alcohols are to be used to achieve hydrocarbon solubility or the "less preferred" secondary alcohols bearing alkyl substitution "further than the beta position from the carbon atom bearing the hydroxyl group" are to be employed (see Col. 3, lines 6-23 and 35-45 of the '640 patent, for example.

The net implication of the combined teachings is that normal secondary alcohols which contain alkyl branching on the alpha carbon atom (i.e., the same carbon atom bearing the hydroxyl group) are not to be selected if hydrocarbon solubility is desired.

SUMMARY OF THE INVENTION

It has now been unexpectedly found that novel halide/alkoxy-containing magnesium complexes, derived from normal acyclic secondary alcohols, which are soluble in hydrocarbon solvents can be formed in accordance with the present invention.

DESCRIPTION OF THE INVENTION

The novel compounds of the present invention are of the formula ROMgX where X is halide, such as chlorine, and R is alkyl and is derived from a normal secondary alcohol containing from about 4 to about 15 carbon atoms. Representative compounds of this type include 2-octanol. The normal secondary alcohols usable herein can be represented by the formula

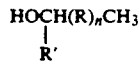

where R' is alkyl of from 1 to about 3 carbons and R is a repeating methylene unit with n ranging from 1 to about 10. An unexpected characteristic of such compounds is their solubility in hydrocarbon solvent in view of the teaching of the previously described references.

The Examples which follow illustrate how the novel and nonobvious compounds described herein can be formed. An inert hydrocarbon solvent (e.g., toluene), secondary alcohol (2-octanol), and alcohol (ethanol) can be added to magnesium halide (MgCl$_2$) and heated to dissolve the magnesium halide. Magnesium metal can then be added along with additional solvent to prepare a soluble halide/alkoxy-containing complex.

Further details regarding the synthesis of this novel class of compound is set forth below in the Examples which follow and in U.S. Ser. No. 497,293, filed on March 22, 1990.

EXAMPLE 1

This Example illustrates the preparation of another hydrocarbon-soluble chloromagnesium alkoxide. The preparation was conducted under a nitrogen atmosphere. The toluene, ethanol, and (for this Example) 2-octanol were dried over molecular sieves and degassed by purging with nitrogen. Magnesium chloride (22.3 grams, 0.234 mole, under 0.2% water content), toluene (104 grams), 2-octanol (76.7 grams, 0.673 mole), and absolute ethanol (30.4 grams, 0.661 mole) were mixed in a three neck round bottom flask equipped with a mechanical stirrer, condenser, and solids addition port. The vessel was heated to 111° C. for about 15-20 minutes with stirring until the MgCl$_2$ dissolved. Then, magnesium metal turnings (5.65 grams, 0.232 mole) were added to the solution mixture slowly, with control of the gas and heat evolution. As the reaction subsided, the solution was heated to reflux for 2-3 hours. The solution was then diluted with toluene (about 74 grams) and filtered through a 0.5 micron fluoropolymer (TEFLON brand) membrane in-line filter. Additional toluene (about 200 grams) was added to prepare a 17 wt % off-yellow 2-octoxy chloromagnesium solution.

| | | |
|---|---|---|
| Magnesium, metal | 5.65 grams | 0.233 mole |
| Magnesium chloride | 22.3 grams | 0.234 mole |
| Toluene | 378 grams | |
| Abs. ethanol | 30.4 grams | 0.661 mole |
| 2-octanol | 7.4 grams | 0.673 mole |
| "ClMg(OC$_8$H$_{17}$)" | 88.3 grams | 0.467 mole |
| Free "ethanol" | 30.4 grams | 0.661 mole |
| Free "2-octanol" | 23.5 grams | 0.206 mole |
| Toluene (total) | 378 grams | |
| Total | 520 grams | (17.0 wt % sol'n) |

The foregoing Example is set forth for illustrative purposes only and should not, therefore, be construed in a limiting sense. The scope of protection sought is set forth in the claims which follow.

We claim:

1. A hydrocarbon soluble halide alkoxy-containing magnesium compound of the formula ROMgX, where X is halide and R is derived from a secondary alcohol containing alkyl branching on the alpha carbon atom.

2. A compound as claimed in claim 1 wherein the secondary alcohol contains from about 3 to about 15 carbon atoms.

3. A compound as claimed in claim 1 wherein X is chloride.

4. A compound as claimed in claim 2 wherein X is chloride.

5. A hydrocarbon solution containing a compound as recited in claim 1 dissolved therein.

6. A hydrocarbon solution containing a compound as recited in claim 2 dissolved therein.

7. A hydrocarbon solution containing a compound as recited in claim 3 dissolved therein.

8. A hydrocarbon solution containing a compound as recited in claim 4 dissolved therein.

9. A hydrocarbon soluble halide alkoxy-containing magnesium compound of the formula ROMgX, where X is halide and R is derived from 2-octanol.

10. A hydrocarbon soluble halide alkoxy-containing magnesium compound of the formula ROMgX, where X is chloride and R is derived from 2-octanol.

11. A hydrocarbon solution containing a compound of the formula ROMgX, where X is halide and R is derived from 2-octanol dissolved therein.

12. A hydrocarbon solution containing a compound of the formula ROMgX, where X is chloride and R is derived from 2-octanol dissolved therein.

* * * * *